United States Patent
Marakovits et al.

(10) Patent No.: US 11,725,757 B2
(45) Date of Patent: Aug. 15, 2023

(54) OUTLET COUPLING

(71) Applicant: Victaulic Company, Easton, PA (US)

(72) Inventors: Richard Marakovits, Bethlehem, PA (US); Scott D. Madara, Nazareth, PA (US); Matthew A. Bowman, Palmer, PA (US); Philip Wayne Bancroft, Belvidere, NJ (US)

(73) Assignee: Victaulic Company, Easton, PA (US)

( * ) Notice: Subject to any disclaimer, the term of this patent is extended or adjusted under 35 U.S.C. 154(b) by 133 days.

(21) Appl. No.: 17/030,767

(22) Filed: Sep. 24, 2020

(65) Prior Publication Data
US 2021/0095797 A1  Apr. 1, 2021

Related U.S. Application Data

(60) Provisional application No. 62/908,010, filed on Sep. 30, 2019.

(51) Int. Cl.
| | | |
|---|---|---|
| *F16L 41/08* | (2006.01) | |
| *F16L 21/02* | (2006.01) | |
| *F16L 17/04* | (2006.01) | |
| *F16L 23/18* | (2006.01) | |
| *F16L 23/08* | (2006.01) | |
| *F16L 21/06* | (2006.01) | |

(52) U.S. Cl.
CPC .............. *F16L 21/02* (2013.01); *F16L 17/04* (2013.01); *F16L 21/065* (2013.01); *F16L 23/08* (2013.01); *F16L 23/18* (2013.01)

(58) Field of Classification Search
CPC ......... F16L 21/02; F16L 41/04; F16L 41/045; F16L 41/06; F16L 41/065; F16L 41/08; F16L 41/086; F16L 41/088; F16L 17/04; F16L 23/16

USPC .......... 285/125.1, 133.1, 197, 198, 199, 369
See application file for complete search history.

(56) References Cited

U.S. PATENT DOCUMENTS

| | | | | |
|---|---|---|---|---|
| 3,362,730 A | * | 1/1968 | St Clair ................. | F16L 17/04 |
| | | | | 285/108 |
| 4,391,458 A | * | 7/1983 | Blakeley ................ | F16L 41/12 |
| | | | | 285/112 |
| 2005/0212284 A1 | | 9/2005 | Dole | |
| 2008/0048445 A1 | | 2/2008 | Lum | |
| 2009/0294554 A1 | | 12/2009 | Wangsgaard | |
| 2017/0328500 A1 | * | 11/2017 | Bowman ................ | F16L 17/04 |
| 2019/0234542 A1 | | 8/2019 | Coplestone | |

FOREIGN PATENT DOCUMENTS

TW           M549848           10/2017

* cited by examiner

*Primary Examiner* — Aaron M Dunwoody
(74) *Attorney, Agent, or Firm* — Ballard Spahr LLP

(57) ABSTRACT

A pipe coupling has first and second segments attached end to end surrounding a central space. The segments define first and second receptacles which receive pipe elements. A port is positioned in one of the segments. The port provides access to the central space. A nipple on the segment extends from the central space and defines a bore aligned with the port. A collar on the segment extends toward the central space. The collar has an outer surface which forms a recess with an inner surface of the segment. A seal is positioned within a channel defined by arcuate keys which surround the receptacles. The seal has a body which defines a first aperture aligned with the receptacles and a second aperture aligned with the bore of the nipple.

23 Claims, 7 Drawing Sheets

OUTLET COUPLING

CROSS REFERENCE TO RELATED APPLICATIONS

This application is based upon and claims benefit of priority to U.S. Provisional Application No. 62/908,010, filed Sep. 30, 2019, which application is hereby incorporated by reference herein.

FIELD OF THE INVENTION

This invention relates to mechanical pipe couplings for joining pipe elements.

BACKGROUND

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe-like form. Pipe elements include pipe stock, pipe fittings such as elbows, caps and tees as well as fluid control components such as valves, reducers, strainers, restrictors, pressure regulators and the like.

The segments define an annular channel that receives a seal, typically an elastomeric ring which engages the ends of each pipe element and cooperates with the segments and the pipe elements to provide a fluid tight seal. The segments have connection members, typically in the form of lugs which project outwardly from the housings. The lugs are adapted to receive fasteners, such as nuts and bolts, which are adjustably tightenable to draw the segments toward one another.

Mechanical couplings for grooved pipe elements according to the prior art have continuous arcuate projections on the segments that engage the outer surfaces of the pipe elements which they are joining end to end. These arcuate projections are part of the segment structure commonly referred to as the "keys" of the coupling. The keys may engage the outer surface of pipe element in various configurations including, for example, pipe element having circumferential grooves. Engagement between the keys and the pipe elements provides mechanical restraint to the joint and ensures that the pipe elements remain coupled even under high internal pressure and external forces.

Methods of securing pipe elements in end to end relation comprise a sequential installation process when mechanical couplings according to the prior art are used. Typically, the coupling is received by the technician with the segments bolted together and the ring gasket captured within the segments' channels. The technician first disassembles the coupling by unbolting it, removes the ring gasket, lubricates it (if not pre-lubricated) and places it around the ends of the pipe elements to be joined. Installation of the ring gasket often requires that it be lubricated and stretched to accommodate the pipe elements. With the ring gasket in place on both pipe elements, the segments are then placed one at a time straddling the ends of the pipe elements and capturing the ring gasket against them. During placement, the segments engage the gasket, the projections are aligned with the grooves, the bolts are inserted through the lugs, the nuts are threaded onto the bolts and tightened, drawing the coupling segments toward one another, compressing the gasket and engaging the projections within the grooves.

In some cases, it is desirable to utilize a coupling to effect a connection not only between two substantially coaxial pipes, but to also create an outlet oriented at an angle to the first two pipes that may be used to affix other pipe elements. The assembly of such couplings, commonly known as outlet couplings, is more complicated and time-consuming due to the need to assure alignment of components which seal the outlet.

As evident from the previous description, installation of mechanical pipe couplings according to the prior art requires that the technician typically handle at least seven individual piece parts (and more when the coupling has more than two segments) and must totally disassemble and reassemble the coupling. Significant time, effort and expense would be saved if the technician could install a mechanical pipe coupling, especially an outlet coupling, without first totally disassembling it and then reassembling it, piece by piece.

SUMMARY

The invention concerns a coupling for joining pipe elements. In one example embodiment the coupling comprises a first and a second segment positioned end to end surrounding a central space and defining first and second oppositely disposed receptacles for receiving the pipe elements. A port is positioned in the first segment between a first and a second end thereof. The port provides access to the central space. A nipple extends from the first segment away from the central space. The nipple defines a bore aligned with the port. A circumferential groove may be positioned on an outer surface of the nipple. A collar extends from the first segment toward the central space. The collar surrounds the port and comprises an outer surface facing an inner surface of the first segment to define a recess therebetween. A first adjustable attachment assembly joins the first end of the first segment to a first end of the second segment. The first adjustable attachment assembly is adapted to draw the first and second segments toward one another.

In an example embodiment each of the first and second segments comprises a first and a second arcuate key positioned on opposite sides of the segments. The first arcuate keys surround the first receptacle and the second arcuate keys surround the second receptacle. The first keys have a first inner surface and the second keys having a second inner surface. The first and second inner surfaces face one another and define a channel therebetween.

By way of example a seal may be positioned within the channel. In an example embodiment the seal comprises a body defining a first aperture aligned with the first and second receptacles and a second aperture aligned with the bore of the nipple. A tube surrounds the second aperture. The tube has an open end which engages the recess and forms a seal between the outer surface of the collar and the inner surface of the first segment.

In an example embodiment a lip surrounds the open end of the tube. The lip engages the outer surface of the collar and forms a sealing gland. The lip has a hook cross sectional shape in an example embodiment. In an example embodiment the seal further comprises a first lobe surrounding the first aperture and positioned proximate to the first receptacle. A first sealing surface is positioned on the first lobe. The first sealing surface is adapted to engage one of the pipe elements upon insertion thereof into the first receptacle. A second lobe surrounds the second aperture and is positioned proximate to the second receptacle. A second sealing surface is positioned on the second lobe. The second sealing surface is adapted to engage one of the pipe elements upon insertion thereof into the second receptacle.

By way of example the seal may further comprise a plurality of ribs projecting from the body into the first aperture. The ribs extend between the first and second receptacles. In an example embodiment each rib has a first end facing the first receptacle and a second end facing the second receptacle. Each of the first and second ends of the ribs is engageable with a respective one of the pipe elements upon insertion of the pipe elements into said central space. Further by way of example the seal may comprise first and second tongues projecting outwardly from the body. The first tongue is captured between the first ends of the first and the second segments and the second tongue is captured between the second ends of the first and second segments. In a specific example embodiment the first and second tongues respectively comprise first and second dovetail shaped tenons and the first and second segments define first and second dovetail shaped mortises positioned respectively at the first and second ends thereof, wherein the first tenon interfits within the first mortise and the second tenon interfits within the second mortise.

In an example embodiment a first horn extends from a first end of the second segment toward the first segment. The first horn is received within a first recess within the first end of the first segment. A second horn extends from a second end of the second segment toward the first segment. The second horn is received within a second recess within the second end of the first segment. The first horn has a first surface facing the central space. The first surface may be angularly oriented relative to an axis of the bore. The second horn has a second surface facing the central space. The second surface may be angularly oriented relative to an axis of the bore. Further by way of example the first recess has a first contact surface angularly oriented so as to contact the first surface of the first horn and the second recess has a second contact surface angularly oriented so as to contact the second surface of the second horn. In an example embodiment a first notch is positioned in the first segment at the first end thereof. The first horn is received within the first notch. A second notch is positioned in the first segment at the second end thereof. The second horn is received within the second notch. By way of example the first and second notches may be V-shaped and the first and second horns may be wedge shaped.

Further by way of example the first adjustable attachment assembly comprises a first lug attached to the first end of the first segment. A second lug is attached to the first end of the second segment and is positioned in facing relation with the first lug. Each lug defines a respective hole. A first fastener extends between the first and second lugs. The first fastener is received within the respective holes. The first fastener is adjustable for drawing the first and second segments toward one another. In an example embodiment a second adjustable attachment assembly joins the second end of the first segment to the second end of the second segment. The second adjustable attachment assembly is adapted to draw the first and second segments toward one another. By way of example the second adjustable attachment assembly comprises a third lug attached to the second end of the first segment. A fourth lug is attached to the second end of the second segment and is positioned in facing relation with the third lug. Each lug defines a respective opening. A second fastener extends between the third and fourth lugs. The second fastener is received within the respective openings. The second fastener is adjustable for drawing the first and second segments toward one another.

An example embodiment may further comprise a spring assembly joining the second end of the first segment to the second end of the second segment. The spring assembly biases the first and second segments away from one another. In an example embodiment the spring assembly comprises a first boss projecting from the second end of the first segment. A second boss projects from the second end of the second segment and is positioned adjacent to the first boss. A first fulcrum is positioned on the first boss and contacts the second boss. The segments pivot about the first fulcrum. A link extends between and captures the first and second bosses. An example embodiment may comprise a second fulcrum positioned on the second boss. The second fulcrum contacts the first fulcrum. An example embodiment may further comprise a first land positioned contiguous with the first fulcrum on the first boss. A second land is positioned contiguous with the second fulcrum on the second boss. The first and second lands are oriented angularly with respect to a plane defining an interface between the first and second segments. Additionally by way of example, a coupling according to the invention may further comprise a first head which projects from the first boss and a second head which projects from the second boss. The link engages the first and second heads for retaining the link to the bosses. In an example embodiment the link comprises a ring encircling the first and second bosses.

DETAILED DESCRIPTION

Figure 1:
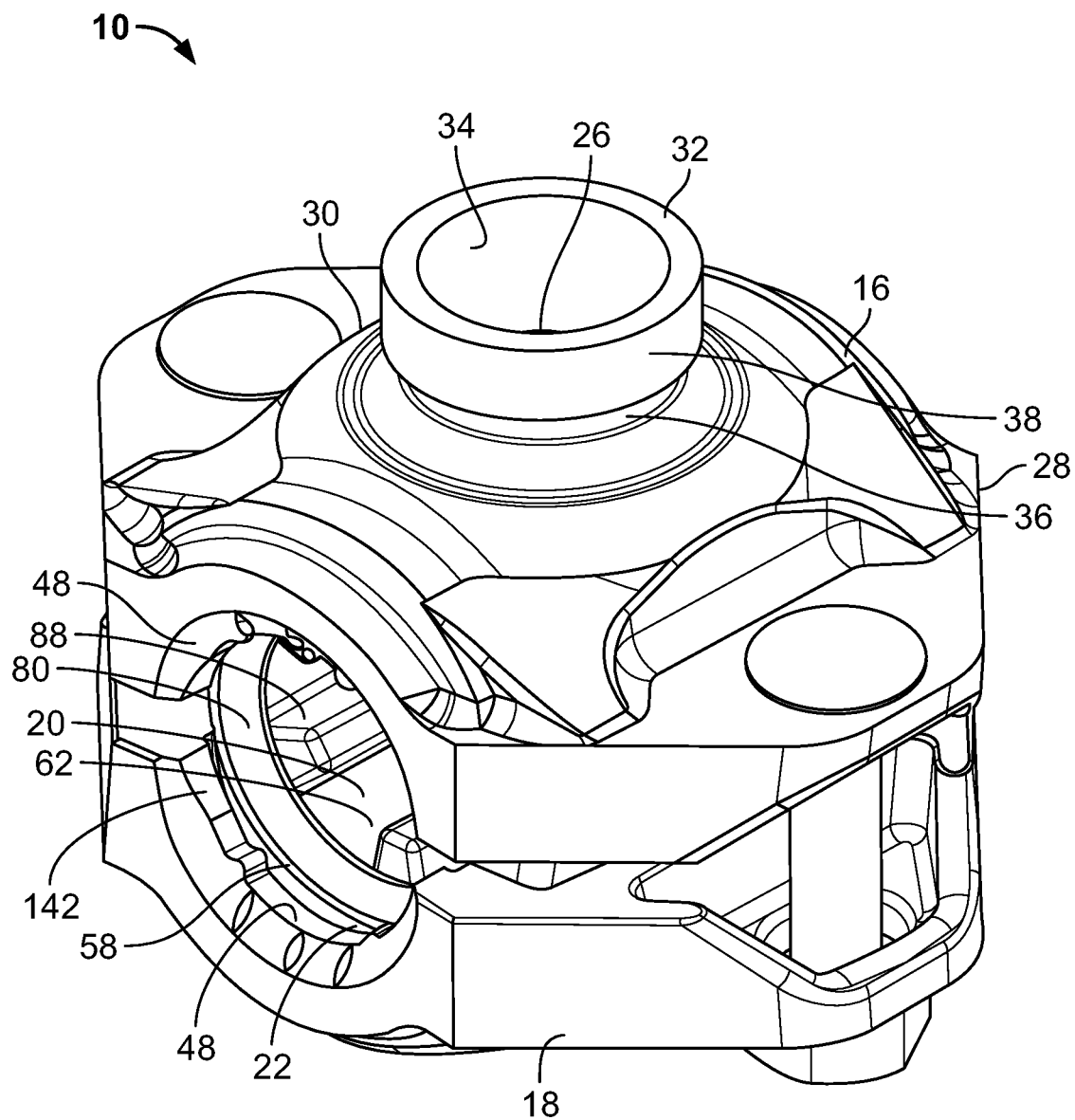
FIG. 1 is an isometric view of an example coupling according to the invention depicted in a pre-assembled state.
Figure 2:
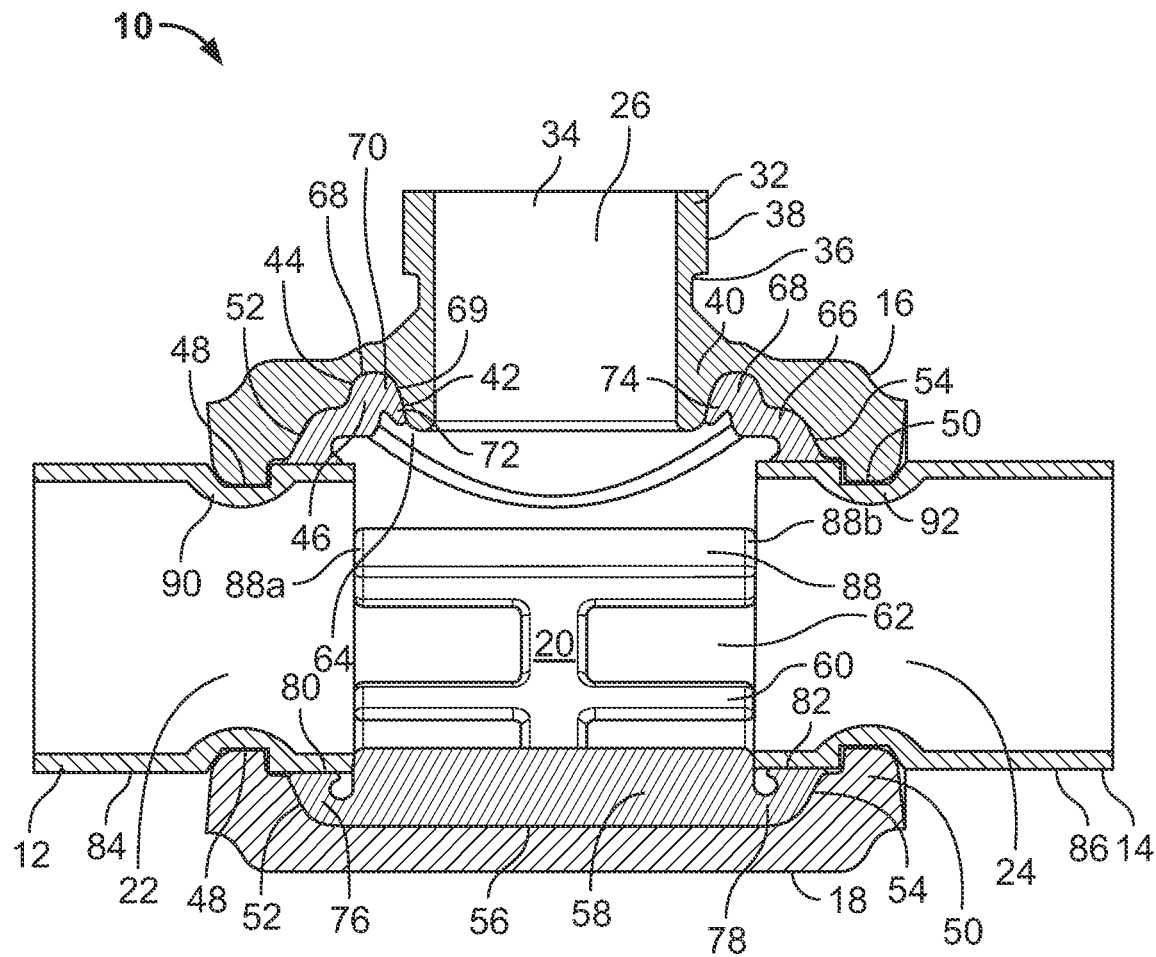
FIG. 2 is a longitudinal sectional view of the pipe coupling of FIG. 1 in an assembled state.

FIGS. 1 and 2 show an example embodiment of a coupling 10 according to the invention for joining pipe elements 12 and 14. Example coupling 10 comprises respective first and second segments 16 and 18 positioned end to end surrounding a central space 20. Segments 16 and 18 define respective first and second receptacles 22 and 24. Receptacles 22 and 24 are oppositely disposed from one another and receive the pipe elements 12 and 14 as shown in FIG. 2. FIG. 1 shows a port 26 positioned in the first segment 16 between the segment's first end 28 and its second end 30 (see also FIG. 2). Port 26 provides access to the central space 20. As shown in FIGS. 1 and 2, a nipple 32 extends from the first segment 16 away from the central space 20. Nipple 32 defines a bore 34 which is aligned with the port 26. A circumferential groove 36 may be positioned on an outer surface 38 of the nipple 32 to permit a grooved pipe element (not shown) to be connected to the coupling 10 using a mechanical coupling (not shown).

As shown in FIG. 2, a collar 40 extends from the first segment 16 toward the central space 20. Collar 40 surrounds the port 26. An outer surface 42 of collar 40 faces an inner surface 44 of the first segment 16. The outer surface 42 and inner surface 44 together define a recess 46 between them.

Figure 3:
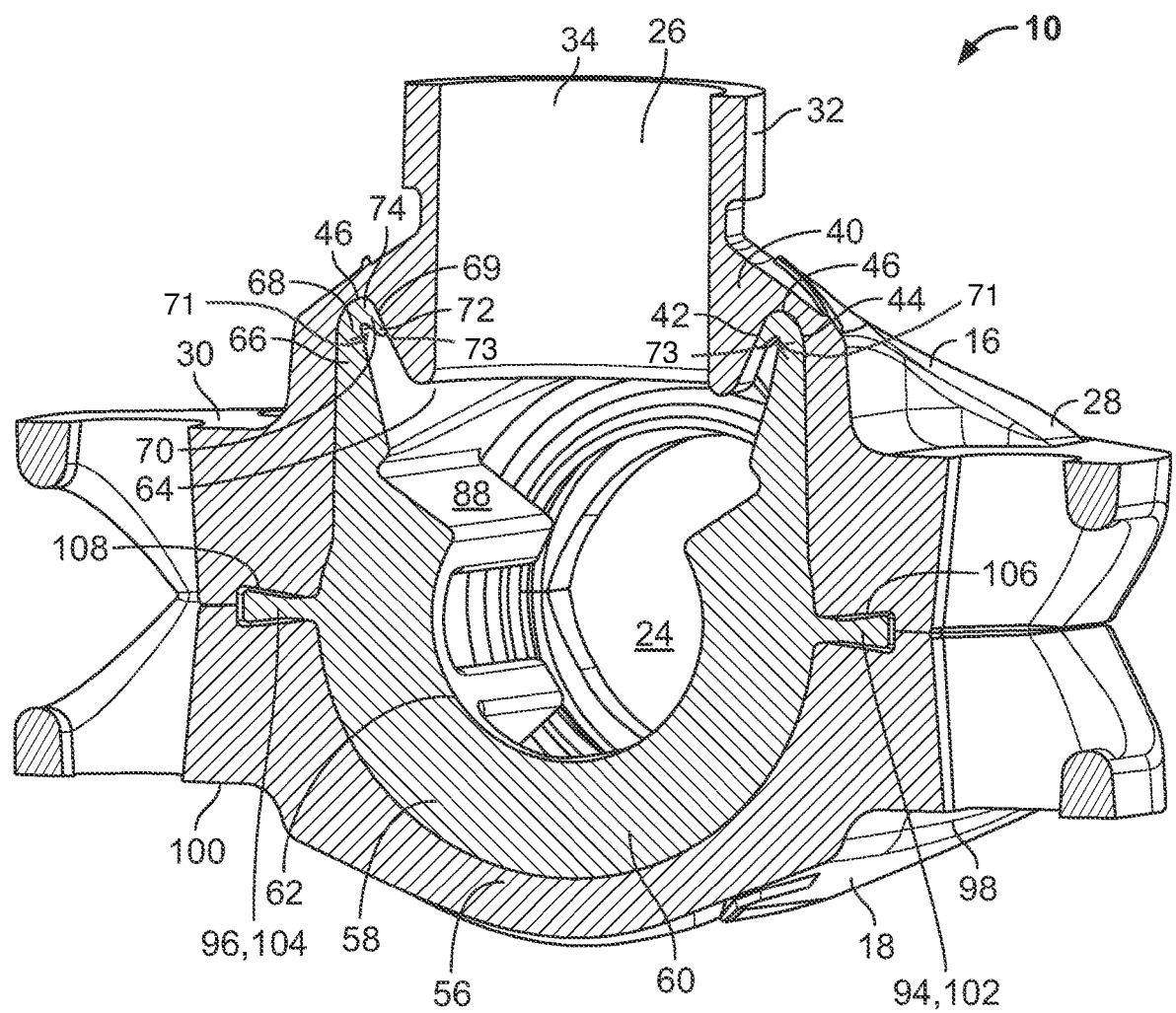
FIG. 3 is a cross sectional isometric view of the pipe coupling shown in FIG. 1.
Figure 5:
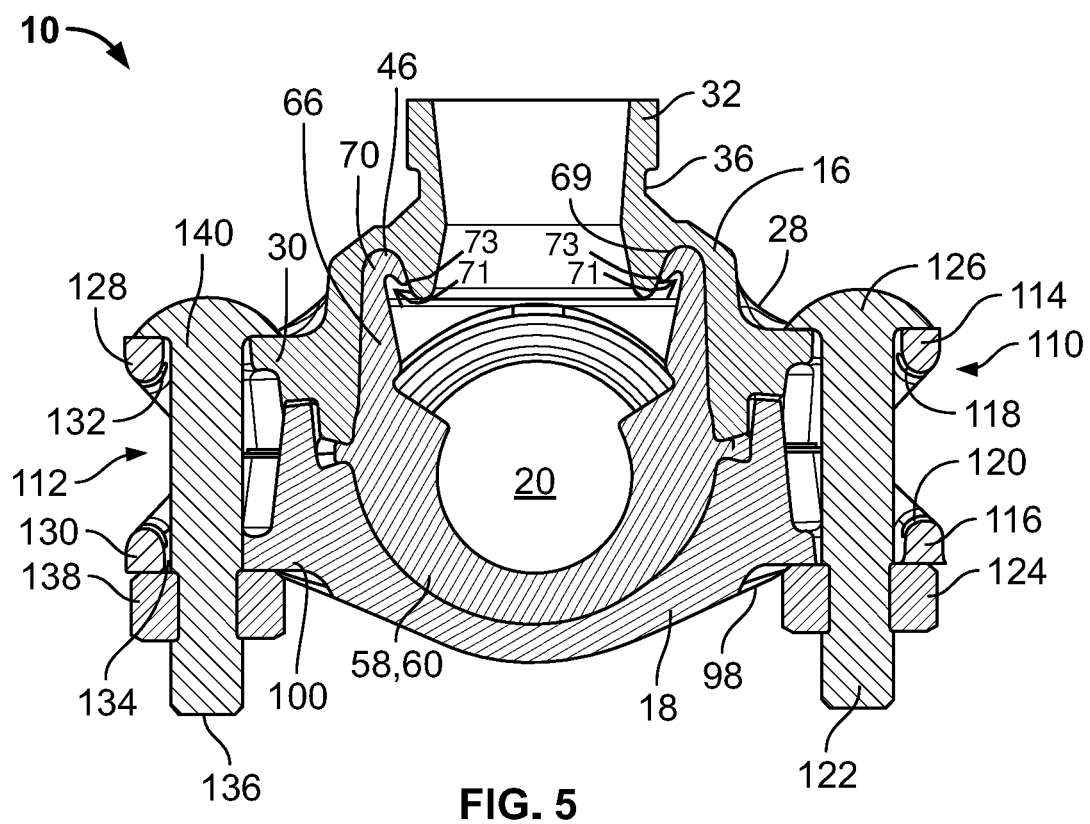
FIG. 5 is an axial cross sectional view of the pipe coupling of FIG. 1 in an assembled state.

As shown in FIGS. 1 and 2, each segment 16 and 18 comprises respective first and second arcuate keys 48 and 50. Keys 48 and 50 are positioned on opposite sides of each segment 16 and 18. First keys 48 surround the first receptacle 22 and the second keys 50 surround the second receptacle 24. As shown in FIG. 2, each first key 48 is supported on a first shoulder 52 and each second key 50 is supported on a second shoulder 54. The first and second shoulders 52 and 54 face one another and define a channel 56 between them. A seal 58 is positioned within channel 56. In the example embodiment shown in FIGS. 2 and 3, the seal 58 comprises a body 60 which defines first and second apertures 62 and 64. First aperture 62 is aligned with the first and second receptacles 22 and 24 and the second aperture 64 is aligned with the bore 34 of the nipple 32. A tube 66 surrounds the second aperture 64. Tube 66 has an open end 68 which engages the recess 46 defined by the collar 40 and the first segment 16 and thereby forms a seal 69 between the collar outer surface 42 and the inner surface 44 of the first segment 16. It is advantageous to form a sealing gland 70 between the collar 40 and the first segment 16 and this is effected in this example by a lip 72 surrounding the open end 68 of the tube 66. The lip 72 may have a hook shaped cross section 74 to permit internal pressure actuation of the sealing gland 70. As shown in FIG. 3, the hook cross section 74 may define a groove 71. The groove 71 of the hook cross section 74 may be positioned within the recess 46. The hook cross section 74 may comprise a tip 73 that engages the collar outer surface 42. As shown in FIGS. 3 and 5, the groove 71 of the hook cross section 74 may be open when the sealing gland 70 is formed.

As further shown in FIG. 2, seal 58 comprises first and second lobes 76 and 78. Both the first and second lobes 76 and 78 surround the first aperture 62, the first lobe 76 being positioned proximate to the first receptacle 22 and the second lobe 78 being positioned proximate to the second receptacle 24. First and second sealing surfaces 80 and 82 are respectively positioned on the first and second lobes 76 and 78. Each sealing surface 80 and 82 is adapted to engage and seal against the respective outer surfaces 84 and 86 of pipe elements 12 and 14 when the pipe elements are inserted into the central space 20 through the first and second receptacles 22 and 24.

As shown in FIGS. 1-3, the seal 58 may further comprise a plurality of ribs 88. Ribs 88 project from body 60 into the first aperture 62 and extend in a direction between the first and second receptacles 22 and 24. Ribs 88 stiffen the body 60 and thereby enable it to maintain a seal within the coupling 10 even when subjected to internal vacuum. As shown in FIG. 2, each rib 88 has a first end 88a facing the first receptacle 22 and a second end 88b facing the second receptacle 24. The first and second ends 88a and 88b of the ribs 88 are engageable with a respective one of the pipe elements 12 and 14 upon insertion of the pipe elements into said central space 20 and thus serve as pipe stops to position the pipe elements 12 and 14 so that their circumferential grooves 90 and 92 align with respective keys 48 and 50 when the pipe joint is formed by coupling 10.

As shown in FIG. 3, seal 58 may further comprise first and second tongues 94 and 96 projecting outwardly from body 60. The first tongue 94 is captured between the first end 28 of the first segment 16 and the first end 98 of the second segment 18; the second tongue 96 is captured between the second end 30 of the first segment 16 and the second end 100 of the second segment 18. Tongues 94 and 96 help locate the segments 16 and 18 and may advantageously comprise respective first and second dovetail shaped tenons 102 and 104 which interfit within respective dovetail shaped mortises 106 and 108 defined by the first and second segments 16 and 18.

Figure 4:
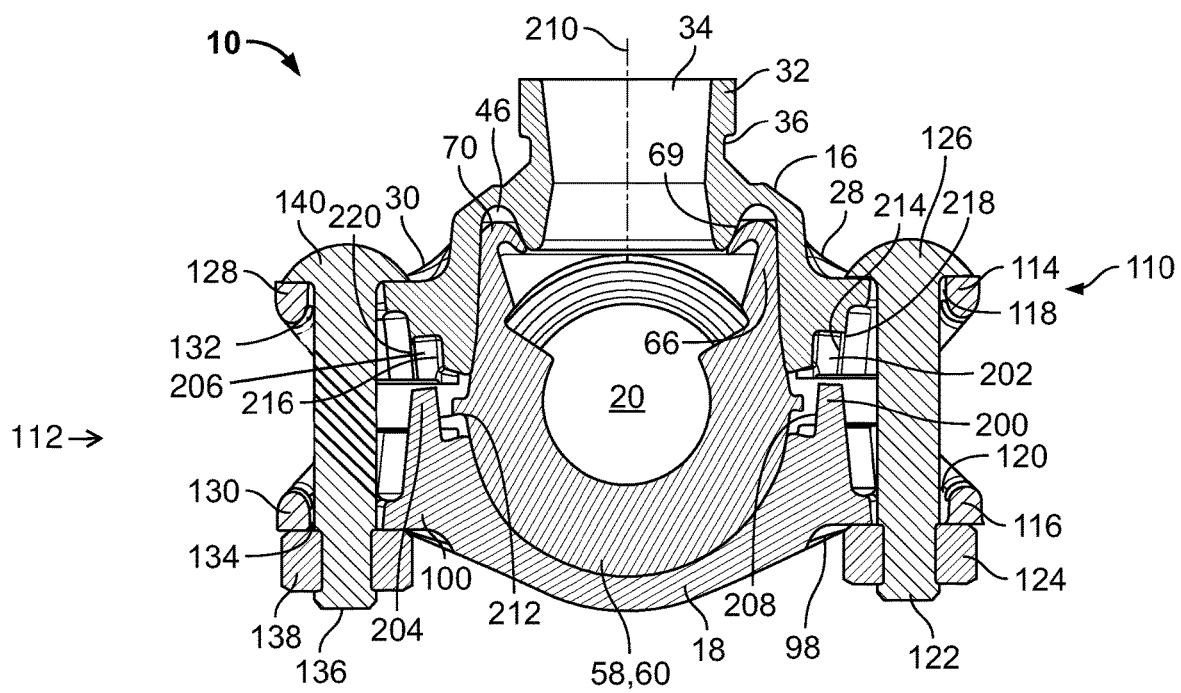
FIG. 4 is an axial cross sectional view of the pipe coupling of FIG. 1 in a pre-assembled state.

FIG. 4 illustrates a coupling 10 having first and second adjustable attachment assemblies 110 and 112 adapted to draw the first and second segments 16 and 18 toward one another to form a pipe joint (compare FIGS. 4 and 5). The first attachment assembly 110 joins the first end 28 of the first segment 16 to the first end 98 of the second segment 18; the second attachment assembly 112 joins the second end 30 of the first segment 16 to the second end 100 of the second segment 18. In the example coupling 10 the first attachment assembly 110 comprises a first lug 114 attached to the first end 28 of the first segment 16 and a second lug 116 attached to the first end 98 of the second segment 18. The first and second lugs 114 and 116 are in facing relation and each lug defines a respective hole 118 and 120 which receives a first fastener 122. First fastener 122 extends between the first and second lugs 114 and 116, the first fastener in this example being a nut 124 and bolt 126 which are adjustable for drawing the first and second segments toward one another upon tightening. Similarly, the second attachment assembly 112 comprises a third lug 128 attached to the second end 30 of the first segment 16 and a fourth lug 130 attached to the second end 100 of the second segment 18. The third and fourth lugs 128 and 130 are in facing relation and each lug defines a respective hole 132 and 134 which receive a second fastener 136. Second fastener 136 extends between the third and fourth lugs 128 and 130, the second fastener in this example being a nut 138 and bolt 140 which are adjustable for drawing the first and second segments 16 and 18 toward one another upon tightening.

As further shown in FIG. 4, a first horn 200 extends from the first end 98 of the second segment 18 toward the first segment 16. First horn 200 is received within a first recess 202 within the first end 28 of the first segment 16. A second horn 204 extends from the second end 100 of the second segment 18 toward the first segment 16. Second horn 204 is received within a second recess 206 within the second end 30 of the first segment 16. First horn 200 has a first surface 208 facing the central space 20. First surface 208 is angularly oriented relative to the bore axis 210 of bore 34. The second horn 204 has a second surface 212 facing the central space 20. Second surface 212 is also angularly oriented relative to the bore axis 212. Surfaces 208 and 212 are advantageously oriented outwardly relative to bore axis 210 to act as lead-in surfaces which guide the segments 16 and 18 into proper engagement. To further improve the guide function of surfaces 208 and 212, the first recess 202 has a first contact surface 214, also angularly oriented so as to contact the first surface 208 of the first horn 200. Similarly, the second recess 206 has a second contact surface 216 also angularly oriented so as to contact the second surface 212 of the second horn 204. It is advantageous if the angular orientation of various surfaces are complementary to one another to provide flat engagement between them.

Figure 4A:
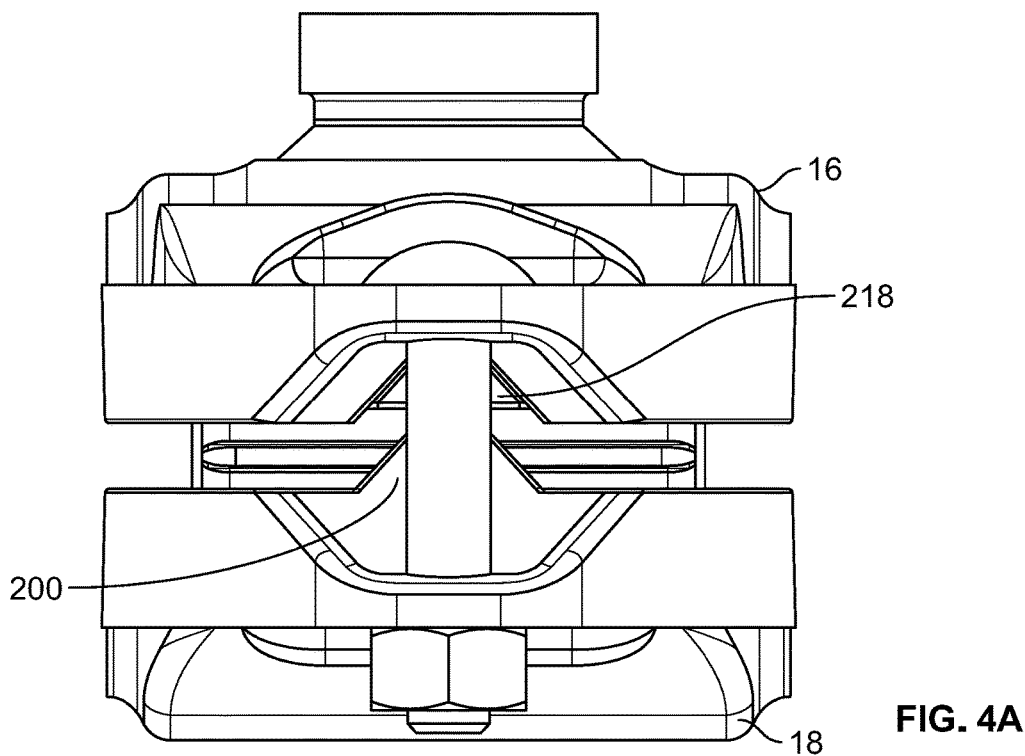
FIG. 4A is a side view of the pipe coupling of FIG. 1 in a pre-assembled state.

As shown in FIGS. 4 and 4A, a first notch 218 is positioned in the first end 28 of first segment 16, and a second notch 220 is positioned in the second end 30 of the first segment 16. The first horn 200 is received within the first notch 218 and the second horn 204 is received within the second notch 220 when the segments 16 and 18 are drawn together into engagement when forming a pipe joint. The horns and notches may be further employed to guide the segments into engagement when the first and second notches 218 and 220 are V-shaped and the first and second horns 200 and 204 are wedge shaped as shown for the first horn and first notch in FIG. 4A. Again, complementary angles between the wedge and notch are shown to have an excellent effect in initiating proper engagement and maintaining proper alignment of the segments 16 and 18.

Operation of the coupling 10 for joining pipe elements 12 and 14 is illustrated in FIGS. 4, 5 and 2. As shown in FIG. 4, coupling 10 is in the "pre-assembled state" as it would come to the user. In this pre-assembled state the segments 16 and 18 are held in spaced apart relation with the segments resting on the seal 58 and held in place by the fasteners 122 and 136. The separation of the segments 12 and 14 is sufficient to permit pipe elements 12 and 14 to be inserted into the central space 20 through respective receptacles 22 and 24 without disassembling the coupling. As shown in FIG. 1, it may be advantageous to provide notches 142 at the ends of keys 48 and 50 (48 shown) to reduce the required separation distance of the segments 16 and 18. With the coupling 10 in its pre-assembled state the pipe elements 12 and 14 are inserted into respective receptacles 22 and 24, the respective outer surfaces 84 and 86 of the pipe elements respectively engaging the sealing surfaces 80 and 82 on the first and second lobes 76, 78 of the seal 58. The pipes 12 and 14 are inserted into the central space 20 so as to engage the ends of ribs 88, thereby aligning the keys 48 and 50 with the respective grooves 90 and 92. As shown in FIGS. 5 and 2, the first and second fasteners 122 and 136 are tightened to draw the first and second segments 16 and 18 toward one another. This compresses the body 60 of seal 58, thereby: 1) effecting a fluid tight seal between the coupling 10 and the pipe elements 12 and 14; 2) engaging the sealing gland 70 within recess 46; and 3) engaging the keys 48 and 50 within grooves 90 and 92 to effect a mechanical connection between the pipe elements and the coupling. A third pipe element (not shown) may be attached to the nipple 32.

As fasteners 122 and 136 are tightened, compressing the body 60 of seal 58 as described above, segments 16 and 18 may have a tendency to rotate or shift relative to each other due to the forces necessary to compress seal 58. Such rotation or shifting would be particularly disadvantageous due to the need to maintain the location of sealing gland 70 within recess 46. Where horn 200 and recesses 202 are employed in segments 18 and 16, they act to locate the segments relative to one another, and if any shift or rotation occurs, contact between sides 204 of the tongue and sidewalls 206 will act to restrict such undesirable motion and which, due to their angled nature, will tend to reduce such shift or rotation as fasteners 122 and 136 continue to be tightened.

Figure 6:
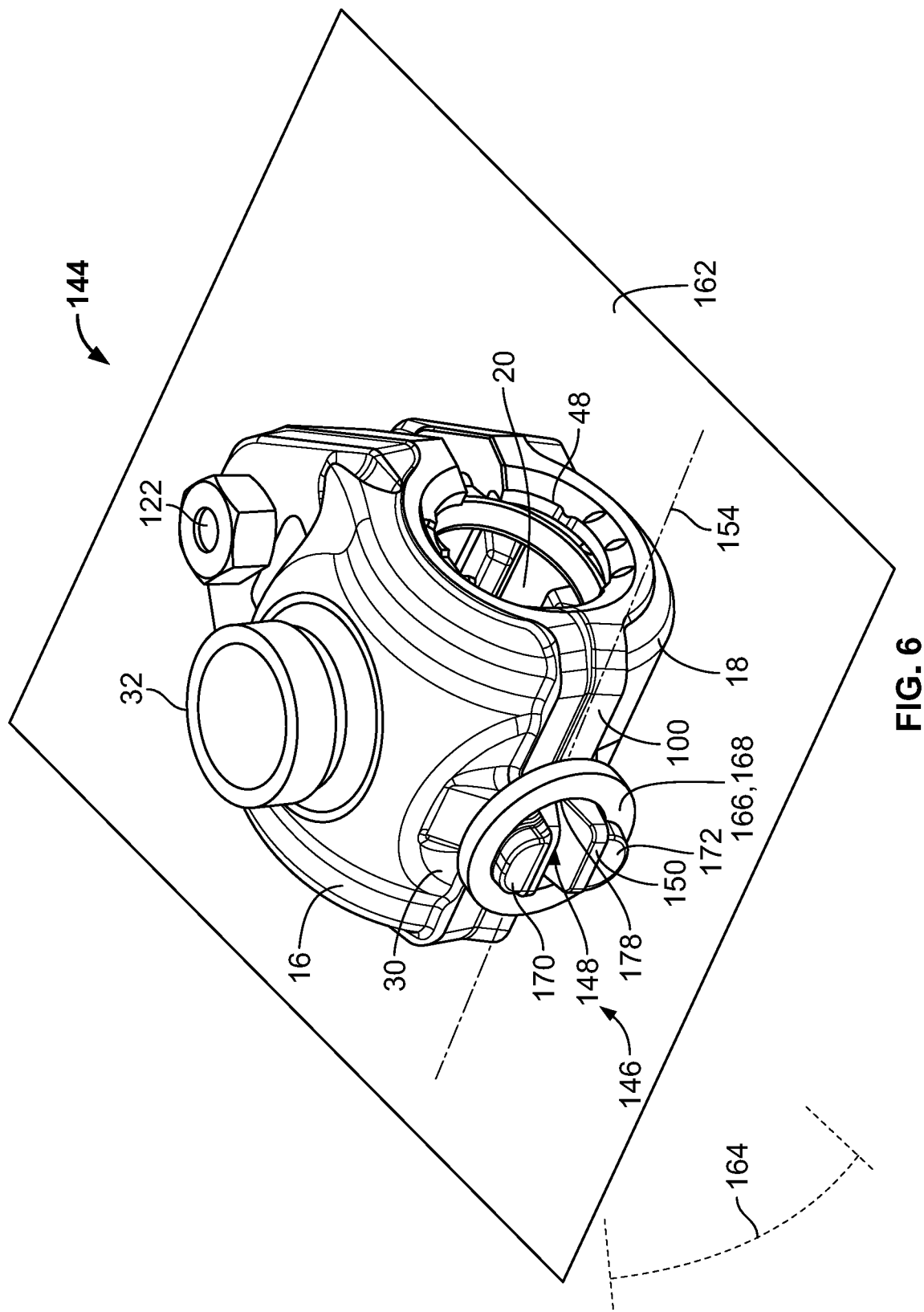
FIG. 6 is an isometric view of another embodiment of a coupling according to the invention.
Figure 7:
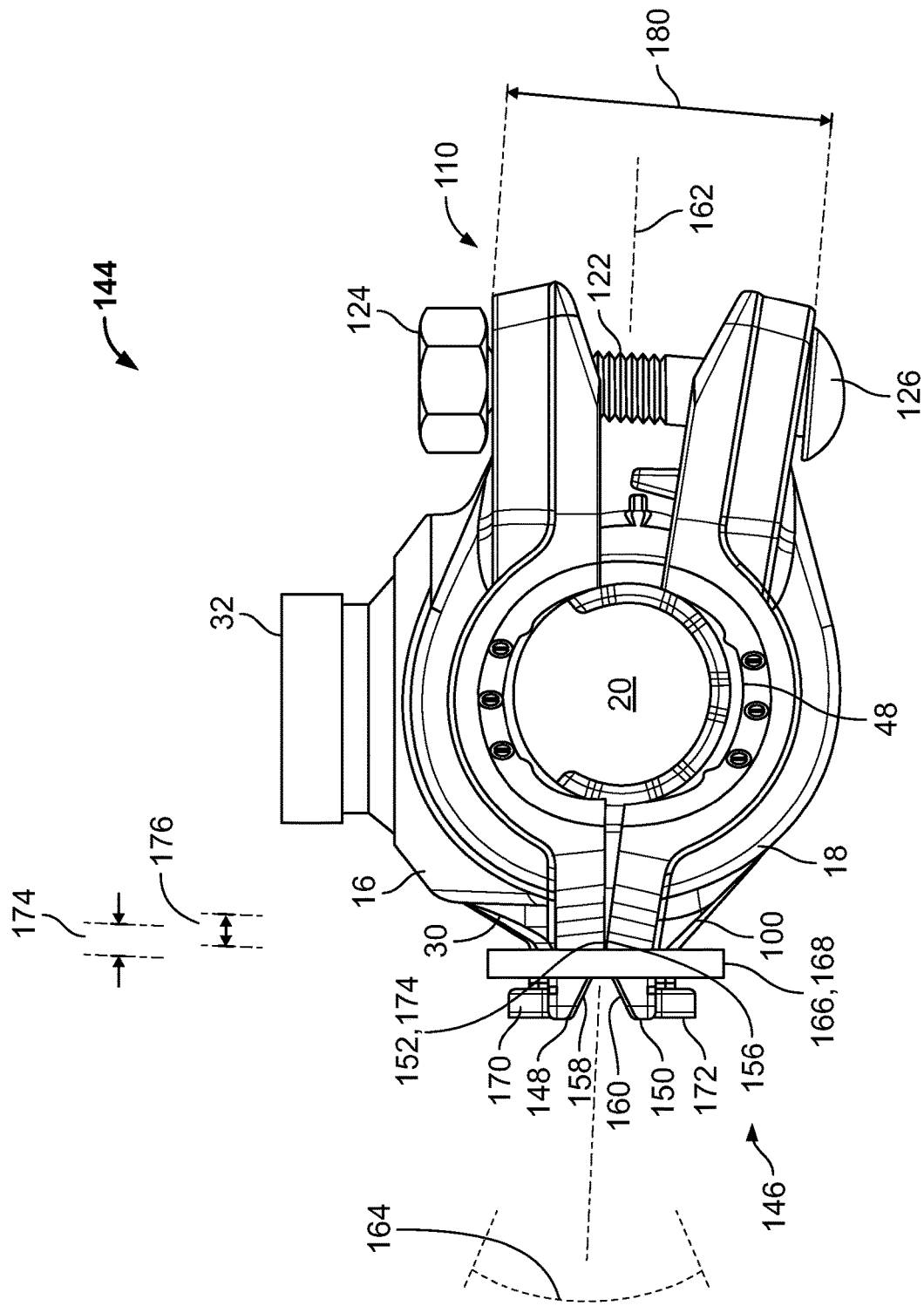
FIG. 7 is an axial view of the coupling shown in FIG. 6.

FIGS. 6 and 7 depict another example embodiment of a coupling 144 according to the invention. In this embodiment a spring assembly 146 joins the second end 30 of first segment 16 to the second end 100 of the second segment 18. The spring assembly 146 biases the segments 16 and 18 away from one another toward or into an open, pre-assembled state shown. When in this open or pre-assembled state, pipe elements can be inserted into the central space 20 without disassembling the coupling 144.

The example spring assembly 146 shown in FIGS. 6 and 7 comprises a first boss 148 projecting from the second end 30 of the first segment 16, and a second boss 150 projecting from the second end 100 of the second segment 18. The second boss 150 is positioned adjacent to the first boss 148. Bosses 148 and 150 are cantilevers and thus are substantially responsible for the biasing force of the spring assembly 146. A first fulcrum 152 is positioned on the first boss 148, the first fulcrum 152 contacting the second boss 150 and providing an axis 154 about which the segments 16 and 18 may pivot. In this example embodiment a second fulcrum 156 is positioned on the second boss 150. The second fulcrum 156 contacts the first fulcrum 152 to further define the pivot axis 154 about which the segments 16 and 18 pivot. First and second fulcrums 152 and 156 are defined in this example embodiment by first and second lands 158 and 160. The first and second lands 158 and 160 are respectively positioned on the first and second bosses 148 and 150, the first land 158 being contiguous with the first fulcrum 152, and the second land 160 being contiguous with the second fulcrum 156 (when present). At least the first land 158 is oriented angularly with respect to a plane 162 comprising the interface between the first and second segments 16 and 18. In this example embodiment both the first and second lands 158 and 160 are angularly oriented with respective orientation angles 164.

A link 166 extends between the first and second bosses 148 and 150. Link 166 captures the bosses, while permitting pivoting motion of the segments 16 and 18. In this example the link 166 comprises a ring 168 which encircles the first and second bosses 148 and 150. Ring 168 is retained on the bosses 148 and 150 by engagement with first and second heads 170 and 172 respectively projecting from the first and second bosses 148 and 150. Ring 168 and the bosses 148 and 150 cooperate to provide the spring biasing action of the spring assembly 146. The thickness 174 of the ring 168, the distance 176 between the fulcrums 152 and 156 and the point where the bosses 148 and 150 engage the ring 168, along with the area moment of inertia of the bosses, are parameters which will establish the spring constant of the spring assembly 146 and thus determine the amount of force necessary to close the coupling 144 and effect a joint. The angular orientation 164 of the lands 158 and 160 and the distance the fastener 122 has been tightened each act to set the maximum limit of separation between the segments 16 and 18, and the inner diameter 178 of the ring 168 determines the minimum separation of the segments when supported by an undeformed spring assembly 146 as shown in FIG. 6. In one embodiment, the angular orientation 164 is such that, if the fastener 122 is not present (such as during the assembly of the coupling by the manufacturer) bosses 148, 150 may be brought near enough together that the inner diameter 178 of ring 168 will clear heads 170, 172, allowing ring 168 to be easily assembled over bosses 148, 150. Subsequent assembly and tightening of fastener 122 to a pre-determined distance 180 (see FIG. 7) acts to separate heads 170, 172 sufficient to retain ring 168 behind heads 170 and 172 as described above. The ring inner diameter 178 may be sized to hold the segments 16 and 18 in the open or pre-assembled state sufficient to permit insertion of pipe elements into the central space 20, or the diameter 178 may be larger, and permit the segments 16 and 18 to be supported in the open or pre-assembled state by other elements of the coupling such as the seal as described above. In this situation the segments 16 and 18 will have some angular free play as the segments are drawn toward one another to close the coupling, the spring assembly 18 not immediately coming into effect upon pivoting of the segments. Ring 168 and the bosses 148 and 150 cooperate to form a sprung hinge, and it is understood that additional hinge embodiments, such as pinned hinges, cast hinges, as well as tongue and stirrup hinges are also feasible in a practical design.

Segments 16 and 18 are drawn toward one another to form a joint by the first adjustable attachment assembly 110 as described above. In this example, fastener 122, comprising bolt 126 and nut 124, when tightened, draws the segments 16 and 18 toward one another against the biasing force of the spring assembly 146. This closing action brings the keys 48 and 50 into engagement with the grooves 90 and 92 of pipe elements 12 and 14 to form a mechanical joint and compresses the seal 58 between the segments 16 and 18 to effect a fluid tight seal. A third pipe element (not shown) may be attached to the nipple 32.

What is claimed is:

1. A coupling for joining pipe elements, said coupling comprising:
   a first and a second segment positioned end to end surrounding a central space and defining first and second oppositely disposed receptacles for receiving said pipe elements;
   a port positioned in said first segment between a first and a second end thereof, said port providing access to said central space;
   a nipple extending from said first segment away from said central space, said nipple defining a bore aligned with said port;
   a collar extending from said first segment toward said central space, said collar surrounding said port and comprising an outer surface facing an inner surface of said first segment to define a recess therebetween;
   a seal positioned between said first and second segments, said seal comprising:
   a body defining a first aperture aligned with said first and second receptacles and a second aperture aligned with said bore of said nipple;
   a tube surrounding said second aperture, said tube having an open end comprising a lip, said lip having a hook cross sectional shape, said hook cross sectional shape engaging both said outer surface of said collar and said inner surface of said first segment within said recess and forming a sealing gland, said hook cross sectional shape defining a groove, wherein said groove of said hook cross sectional shape is within said recess;
   a first adjustable attachment assembly joining said first end of said first segment to a first end of said second segment, said first adjustable attachment assembly adapted to draw said first and second segments toward one another.

2. The coupling according to claim 1, wherein each of said first and second segments comprises a first and a second arcuate key positioned on opposite sides of said segments, said first arcuate keys surrounding said first receptacle, said second arcuate keys surrounding said second receptacle, said first keys having a first inner surface and said second keys having a second inner surface, said first and second inner surfaces facing one another and defining a channel therebetween.

3. The coupling according to claim 1, wherein said seal further comprises:
   a first lobe surrounding said first aperture and positioned proximate to said first receptacle;
   a first sealing surface positioned on said first lobe, said first sealing surface adapted to engage one of said pipe elements upon insertion thereof into said first receptacle;
   a second lobe surrounding said first aperture and positioned proximate to said second receptacle;
   a second sealing surface positioned on said second lobe, said second sealing surface adapted to engage one of said pipe elements upon insertion thereof into said second receptacle.

4. The coupling according to claim 1, wherein said seal further comprises a plurality of ribs projecting from said body into said first aperture, said ribs extending between said first and second receptacles.

5. The coupling according to claim 4, wherein each said rib has a first end facing said first receptacle and a second end facing said second receptacle, each of said first and second ends of said ribs being engageable with a respective one of said pipe elements upon insertion of said pipe elements into said central space.

6. The coupling according to claim 1, wherein said seal further comprises first and second tongues projecting outwardly from said body, said first tongue being captured between said first ends of said first and said second segments, said second tongue being captured between said second ends of said first and second segments.

7. The coupling according to claim 6, wherein:
   said first and second tongues respectively comprise first and second dovetail shaped tenons;
   said first and second segments define first and second dovetail shaped mortises positioned respectively at said first and second ends thereof, said first tenon interfitting within said first mortise and said second tenon interfitting within said second mortise.

8. The coupling according to claim 1, further comprising a circumferential groove positioned on an outer surface of said nipple.

9. The coupling according to claim 1, further comprising:
   a first horn extending from a first end of said second segment toward said first segment, said first horn being received within a first recess within said first end of said first segment;
   a second horn extending from a second end of said second segment toward said first segment, said second horn being received within a second recess within said second end of said first segment; wherein
   said first horn has a first surface facing said central space, said first surface being angularly oriented relative to an axis of said bore;
   said second horn has a second surface facing said central space, said second surface being angularly oriented relative to an axis of said bore.

10. The coupling according to claim 9, wherein:
    said first recess has a first contact surface angularly oriented so as to contact said first surface of said first horn;
    said second recess has a second contact surface angularly oriented so as to contact said second surface of said second horn.

11. The coupling according to claim 9, further comprising:
    a first notch positioned in said first segment at said first end thereof;
    said first horn being received within said first notch;
    a second notch positioned in said first segment at said second end thereof;
    said second horn being received within said second notch.

12. The coupling according to claim 11, wherein said first and second notches are V-shaped and said first and second horns are wedge shaped.

13. The coupling according to claim 1, wherein said first adjustable attachment assembly comprises:
    a first lug attached to said first end of said first segment;

a second lug attached to said first end of said second segment and positioned in facing relation with said first lug, each said lug defining a respective hole;

a first fastener extending between said first and second lugs, said first fastener being received within said respective holes, said first fastener being adjustable for drawing said first and second segments toward one another.

14. The coupling according to claim 13, further comprising a second adjustable attachment assembly joining said second end of said first segment to said second end of said second segment, said second adjustable attachment assembly adapted to draw said first and second segments toward one another.

15. The coupling according to claim 14, wherein said second adjustable attachment assembly comprises:

a third lug attached to said second end of said first segment;

a fourth lug attached to said second end of said second segment and positioned in facing relation with said third lug, each said lug defining a respective opening;

a second fastener extending between said third and fourth lugs, said second fastener being received within said respective openings, said second fastener being adjustable for drawing said first and second segments toward one another.

16. The coupling according to claim 1, further comprising a spring assembly joining said second end of said first segment to said second end of said second segment, said spring assembly biasing said first and second segments away from one another.

17. The coupling according to claim 16, wherein said spring assembly comprises:

a first boss projecting from said second end of said first segment;

a second boss projecting from said second end of said second segment and positioned adjacent to said first boss;

a first fulcrum positioned on said first boss and contacting said second boss, said segments pivoting about said first fulcrum;

a link extending between and capturing said first and second bosses.

18. The coupling according to claim 17, further comprising a second fulcrum positioned on said second boss, said second fulcrum contacting said first fulcrum.

19. The coupling according to claim 18, further comprising:

a first land positioned contiguous with said first fulcrum on said first boss;

a second land positioned contiguous with said second fulcrum on said second boss, said first and second lands being oriented angularly with respect to a plane defining an interface between said first and second segments.

20. The coupling according to claim 17, further comprising:

a first head projecting from said first boss;

a second head projecting from said second boss, said link engaging said first and second heads for retaining said link to said bosses.

21. The coupling according to claim 17, wherein said link comprises a ring encircling said first and second bosses.

22. The coupling according to claim 1, wherein said hook cross sectional shape comprises a tip engaging said outer surface of said collar.

23. The coupling according to claim 1, wherein said groove is open when said sealing gland is formed.

* * * * *